(12) United States Patent
Shiow-Ling et al.

(10) Patent No.: US 8,063,135 B2
(45) Date of Patent: Nov. 22, 2011

(54) WATER-BASED POLYMER COMPOSITION AND ARTICLES MADE THEREFROM

(75) Inventors: Lin Shiow-Ling, Lawrenceville, NJ (US); David Gibala, Downington, PA (US); Anthony Lippl, Cummings, GA (US); Geoffrey Scott Underwood, Atlanta, GA (US); Tiziana Poggio, Montechiaro d'Acqui (IT)

(73) Assignee: Solvay (Societe Anonyme), Brussels (BE)

( * ) Notice: Subject to any disclaimer, the term of this patent is extended or adjusted under 35 U.S.C. 154(b) by 835 days.

(21) Appl. No.: 10/902,007

(22) Filed: Jul. 30, 2004

(65) Prior Publication Data

US 2005/0070659 A1    Mar. 31, 2005

Related U.S. Application Data

(60) Provisional application No. 60/608,933, filed on Jul. 31, 2003.

(51) Int. Cl.
  *C08L 79/08* (2006.01)
  *B32B 27/28* (2006.01)
(52) U.S. Cl. .......................... 524/514; 524/502; 428/421
(58) Field of Classification Search .................. 524/514; 428/421
  See application file for complete search history.

(56) References Cited

U.S. PATENT DOCUMENTS

| | | | |
|---|---|---|---|
| 3,661,831 A | 5/1972 | Fang | |
| 3,989,873 A | 11/1976 | Robertson et al. | |
| 4,011,361 A | 3/1977 | Vassiliou et al. | |
| 4,014,834 A | 3/1977 | Concannon | |
| 4,039,713 A | 8/1977 | Vassiliou | |
| 4,049,863 A | 9/1977 | Vassiliou | |
| 4,087,374 A | 5/1978 | Schneider et al. | |
| 4,087,394 A | 5/1978 | Concannon | |
| 4,098,756 A | 7/1978 | Miller et al. | |
| 4,143,204 A | 3/1979 | Fang | |
| 4,170,686 A | 10/1979 | Miller et al. | |
| 4,351,882 A | 9/1982 | Concannon | |
| 5,009,959 A * | 4/1991 | Matsushita et al. | 428/419 |
| 5,168,013 A | 12/1992 | Tannenbaum | |
| 5,846,645 A * | 12/1998 | Yokota et al. | 428/327 |
| 5,880,205 A | 3/1999 | Tannenbaum | |
| 6,479,581 B1 | 11/2002 | Ireland et al. | |

FOREIGN PATENT DOCUMENTS

| | | | |
|---|---|---|---|
| JP | 57177067 A | * | 10/1982 |
| JP | 63-112674 | | 5/1988 |
| WO | 94/14904 | | 7/1994 |

OTHER PUBLICATIONS

Full English-language translation of JP 57-177067, Oct. 30, 1982.*

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

The present invention relates to a water-based polymer composition, comprising:
  at least one polymer (P) comprising recurring units (R1), from 0 to at most 25% mol of said recurring units (R1) comprising a carboxylic acid group (in acid or salt form);
  at least one aromatic polyamic acid (A) comprising recurring units, more than 50% mol of said recurring units comprising at least one aromatic ring and at least one amic acid group and/or imide group [recurring units (R2)], more than 50% mol of recurring units (R2) comprising at least one amic acid group, part or all of the amic acid groups being neutralized by at least one basic compound (B);
  water;
  optionally, at least one organic solvent (S) of the aromatic polyamic acid (A), in an amount of less than 20% wt with respect to the weight of the aromatic polyamic acid.
The polymer (P) is preferably a fluoropolymer; it can be either a partially fluorinated fluoropolymer, such as ECTFE, or a perfluorinated fluoropolymer such as TFE polymers.
The water-based polymer compositions of this invention may be notably found useful for coating applications where organic solvents may not be desired or tolerated.

22 Claims, No Drawings

WATER-BASED POLYMER COMPOSITION AND ARTICLES MADE THEREFROM

Reference to Related Applications

This application claims priority to application Ser. No. 10/632,146, filed Jul. 31, 2003, incorporated herein by reference. application Ser. No. 10/632,146 was converted to a provisional application on Jul. 29, 2004.

This invention is directed to polymer compositions comprising a polymer substantially free of carboxylic acid groups, especially a fluoropolymer, and a high-temperature resistant polymer. Such polymer compositions are useful notably for coating metal surfaces, including as protective coating, primer or top layer in mono- or multi-layer coating systems.

It is known that polymers polymer substantially free of carboxylic acid groups, especially fluoropolymers (in particular CTFE or TFE-based polymers) have unique properties, such as high heat and chemical resistance, high purity, lubricity. Because of their properties, these fluoropolymers are widely used in the form of dispersions in a liquid medium or as powders to coat or impregnate articles, especially to obtain anti-stick properties. It is also well known that fluoropolymers do not tend to stick on both metals and non metallic substrates.

To obtain coatings of a polymer free of carboxylic acid groups, especially of a fluoropolymer such as a polytetrafluoroethylene (PTFE), a tetrafluoroethylene-hexafluoropropene copolymer (FEP) or a tetrafluoroethylene-perfluoroalkyl vinyl ether copolymer (PFA or MFA) which adhere onto a substrate, it is generally required to apply a primer composition on the substrate, said primer having adhesion properties to the substrates and also to the polymer free of carboxylic acid groups.

Different solutions have been already proposed for primer compositions that provide adhesion of a halogenated polymer, especially a fluoropolymer coating, on metallic and non metallic substrates. In many cases mixtures of halogenated polymers, especially fluoropolymers, with thermally stable engineering polymers have been used to obtain very well adhered coatings.

A class of engineering polymers of particular interest to be mixed with the polymers substantially free of carboxylic groups, especially with the fluoropolymer, in order to form a primer consist of polyimides, especially polyamideimides (PAI). Indeed, polyimides possess usually excellent film forming capabilities and they provide usually high chemical and thermal resistance.

Since polyimides, especially polyamideimides, in their polyamic acid form, were deemed to undergo hydrolytic, degradation in aqueous medium, even at room temperature, their molecular weight being irreversibly reduced, with negative impacts on final mechanical properties, they were used in the past as film-forming substances in combination with fluoropolymers not in aqueous medium but dissolved in an appropriate organic solvent.

Increased attention to the environmental hazard prevention has generated a strong need for moving towards purely solvent-free primer compositions, while maintaining or even improving coating performances, in particular substrate adhesion and mechanical and chemical resistance.

In the technique, various methods were thus studied in order to improve the stability and the solubility in water of polyimides, especially of PAI, to reduce the amount of organic solvent.

U.S. Pat. No. 4,014,834 (to DuPont) describes the preparation of a PAI solution in water by salification and contemporary dissolution in water of a PAI in its polyamic acid form in the presence of viscosity reducing agents (furfuryl alcohol) and of coalescing agents, i.e. organic liquid which can dissolve the PAI, like N-methylpyrrolidone, dimethylformamide, N,N-dimethylacetamide, dimethylsulfoxide, cresylic acid, sulfolane and formamide. The so-obtained PAI solutions are suitable for being mixed with PTFE dispersions in order to obtain formulations having high adhesiveness on metallic substrates. Nevertheless, the formulations according to U.S. Pat. No. 4,014,834 suffer tom a high content of organic solvent.

Similarly, U.S. Pat. No. 5,168,013 (to DuPont) discloses the use of particular mixtures of polyamideimide or polyethersulfone with at least two different polytetrafluoroethylene resins having very different viscosities useful for solving the problem of application of the aqueous coatings on smooth metallic surfaces. However, U.S. Pat. No. 5,168,013 does not address the problem of lowering the content of organic substances in the primer composition.

Moreover, since the organic solvents have generally a strong affinity for polar resins like polyimides, (forming stoichiometric complexes with polyimide moieties), their elimination requires extended drying periods, on at reduced pressure.

The energy costs associated with drying and curing, together with the necessity for recovery of the volatilized solvent, due to environmental considerations, as well as the cost of the solvent, substantially impacts the commercial attractiveness of polyimide resins, in particular of PAI resins, in primer/coating applications.

According to the present invention, the above-mentioned difficulties are remarkably overcome by a water-based polymer composition, comprising:
- at least one polymer (P) comprising recurring units (R1), from 0 to at most 25% mol of said recurnng units (R1) compnsing a carboxylic acid group (in acid or salt form);
- at least one aromatic polyamic acid (A) comprising recurring units, more than 50% mol of said recurring units comprising at least one aromatic ring and at least one amic acid group and/or imide group [recurring units (R2)], more than 50% mol of recurring units (R2) comprising at least one ainic acid group, part or all of the amic acid groups being neutralized by at least one basic compound (B);
- water;
- optionally, at least one organic solvent (S) of the aromatic polyamic acid (A), in an amount of less than 20% wt with respect to the weight of the aromatic polyamic acid.

The water-based polymer composition is particularly well suited for providing for coatings having high adhesion to substrates, and containing a low amount of organic solvent, unlike prior art coating and primer formulations, and are therefore more desirable for use where energy costs and environmental factors are important considerations.

Preferably in the polymer (P), from 0 to at most 10% mol, more preferably from 0 to at most 5% mol of recurring units (R1) comprise a carboxylic acid group (in acid or salt form).

By way of examples of polymers (P), mention may be made of halogenated vinyl polymers, vinyl polyesters, including vinyl acetate polymers, (meth)acrylic polymers, polyesters, polysiloxanes, polyamides, polysulphides, polyurethanes, polycarbonates, polyethers, epoxy resins, alkyd resins, rosin, nitrocellulose, cellulose acetates, polyvinyl alcohols, chlorinated polyethylenes, natural rubber, synthetic rubbers such as copolymers of styrene and butadiene, neoprene, isoprene, chloroprene, and graft polymers prepared on the basis of a butadiene polymer, aromatic polycondensates such as polyphtalamides, polyarylamides, wholly aromatic polyesters, polyphenylene sulphides, aromatic polyamideimides and aromatic polyketones like those commonly known as PEEK or PEKK.

Preferably, polymer (P) is a halogenated polymer.

To the purpose of the present invention, "halogenated polymer" is intended to denote any polymer comprising more than 25% wt of recurrin units derived from at least one ethylenically unsaturated monomer comprising at least one halogen atom (hereafter, halogenated monomer), Halogenated monomers can notably be chosen among the group consisting of chlorinated monomers and fluorinated monomers.

Non limitative examples of chlorinated monomers are vinyl chloride and vinylidene chloride.

The halogenated polymer is preferably a fluoropolymer.

To the purpose of the present invention, "fluoropolymer" is intended to denote any polymer comprising more Can 25% wt of recurring units derived from at least one ethylenically unsaturated monomer comprising at least one fluorine atom (hereinafter, fluorinated monomer).

The fluoropolymer comprises preferably more than 30% wt, more preferably more than 40% wt of recurring units derived from the fluorinated monomer.

Non limitative examples of fluorinated monomers are notably tetrafluoroethylene (TFE), vinylidene fluoride ($VF_2$) and chlorotrifluoroethylene (CTFE).

The fluorinated monomer comprises preferably several fluorine atoms. More preferably, it comprises more fluorine atoms than hydrogen atoms. Still more preferably, it is free of hydrogen atom. Most preferably, the flurorinated monomer is tetrafluoroethylene and/or chlorotrifluoroethylene.

Preferably, the fluoropolymer consists of recurring units derived from the fluorinated monomer and at least one other comonomer.

The comonomer can notably be either hydrogenated (i.e. See of fluorine atom) or fluorinated (i,e. containing at least one fluorine atom).

Non limitative examples of suitable hydrogenated comonomers are notably ethylene, propylene and acrylic monomers, like methyl methacrylate, acrylic acid, methacrylic acid and hydroxyethyl acrylate, as well as styrene monomers, like styrene.

Non limitative examples of suitable fluorinated comonomers are notably;
- $C_3$-$C_8$ perfluoroolefins, such as hexafluoropropene;
- $C_2$-$C_8$ hydrogenated monofluoroolefins, such a vinyl fluoride;
- 1,2-difluoroethylene and trifluoroethylene;
- perfluoroalkylethylenes complying with formula $CH_2=CH-R_{f0}$, in which $R_{f0}$ is a $C_1$-$C_6$ perfluoroalkyl;
- chloro- and/or bromo- and/or iodo-$C_2$-$C_6$ fluoroolefins, like chlorotrifluoroethylene;
- fluoro- and perfluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_2$, $C_3F_7$;
- $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;
- fluorodioxoles, especially perfluorodioxoles.

The polymer (P) consists advantageously of particles.

The polymer (P)particles have an average particle size of advantageously at least 20 nm, preferably of at least 75 nm, more preferably of at least 100 nm.

The polymer (P) particles have an average particle size of advantageously at most 200 µm, preferably of at most 150 µm, more preferably of at most 125 µm.

The polymer (P) can be notably provided in dry solid form (as dry particles) or as dispersion in water or as latex.

By "dispersion" is meant that the polymer (P) particles are stably dispersed in the aqueous medium, so that settling of the particles does not occur within the time when the dispersion will be used. Such dispersions can be obtained directly by the process known as dispersion polymerization (i.e. latex), optionally followed by concentration and/or further addition of surfactant. For those polymers that are soluble in organic solvents the dispersion can also be advantageously obtained by mixing the polymer solution with water, optionally containing surfactants, to precipitate polymer particles.

Otherwise, dispersions can be prepared by any means known to those skilled in the art. The dispersions are usually prepared by means of size-reduction equipment, such as, for example, a high-pressure homogenizer, a colloid mill, a fast pump, a vibratory agitator or an ultrasound device. The dispersions are preferably prepared by means of a high-pressure homogenizer or colloid mill and in a particularly preferred way by means of a high-pressure homogenizer.

The water-based polymer composition of the invention comprises advantageously at least 0.5% wt, preferably at least 1% wt more preferably at least 3% wt of polymer (P) with respect to the total weight of the composition.

The water-based polymer composition of the invention comprises advantageously at most 75% wt, preferably at most 60% wt, more preferably at most 55% wt of polymer (P) with respect to the total weight of the composition.

Water-based polymer compositions comprising from 5 to 50% wt of polymer (P) with respect to the total weight of the composition gave very satisfactory results.

To the purpose of the present invention, "aromatic polyamic acid" (A) is intended to denote any polymer comprising recurring units, more tan 50% mol of said recurring units comprising at least one aromatic ring and at least one amic acid group and/or imide group [recurring units (R2)], more than 50% mol of recurring units (R2) comprising at least one amic acid group.

The recurring units (R2) are advantageously chosen from.

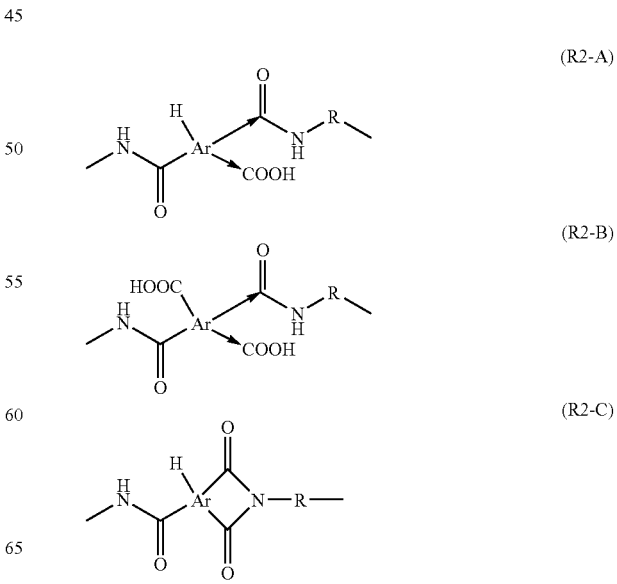

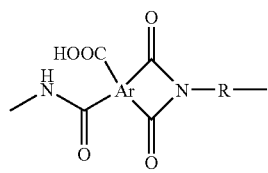
(R2-D)

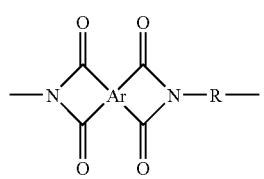
(R2-E)

wherein:
- the → denotes isomerism so that in any recurring unit within the aromatic polyamic acid structure the groups to which the arrows point may exist as shown or in an interchanged position Ar is typically:

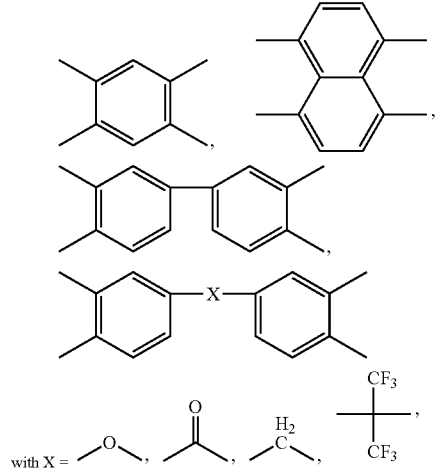

with $X = $ —O—, <span>—C(=O)—</span>, —CH$_2$—, —C(CF$_3$)$_2$—, —(CF$_2$)$_n$— with n=0,1,2,3,4 or 5;

R is typically:

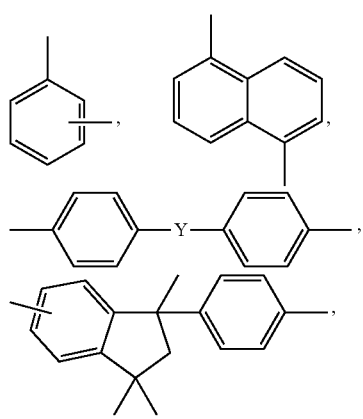

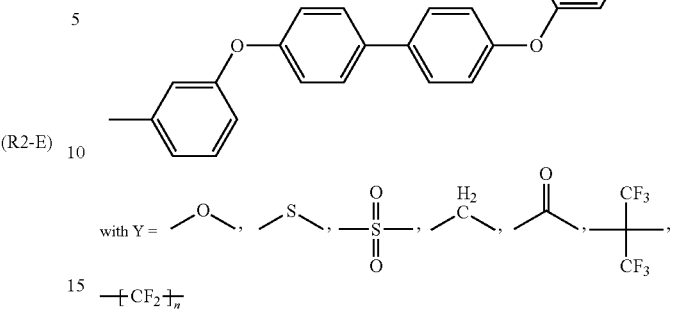

with $Y = $ —O—, —S—, —S(=O)$_2$—, —CH$_2$—, —C(=O)—, —C(CF$_3$)$_2$—, —(CF$_2$)$_n$— with n=0,1,2,3,4 or 5.

Recurring units (R2) are more preferably chosen from:

(i)

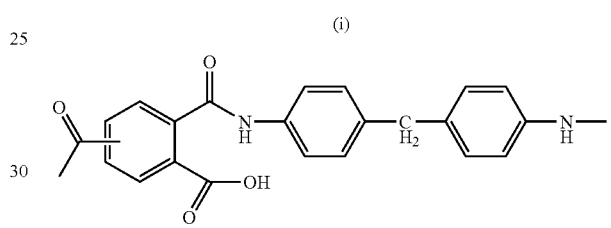
(i-a)

and/or the corresponding imide-group containing recurring unit:

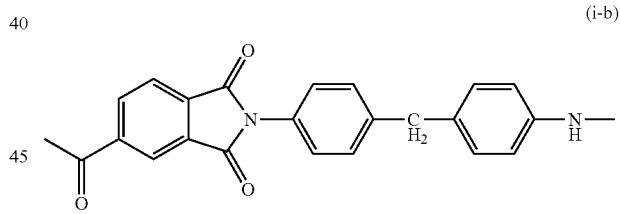
(i-b)

wherein the attachment of the two amide groups to the aromatic ring as shown in (i-a) will be understood to represent the 1,3 and the 1,4 polyamide-amic acid configurations;

(ii)

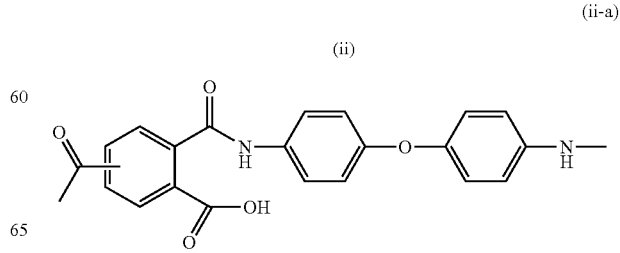
(ii-a)

and/or the corresponding imide-group containing recurring unit:

(ii-b)

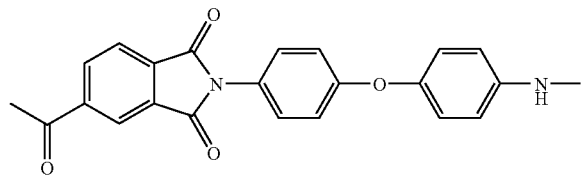

wherein the attachment of the two amide groups to the aromatic ring as shown in (ii-a) will be understood to represent the 1,3 and the 1,4 polyamide-amic acid configurations; and (iii)

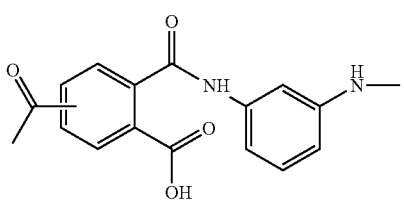

(iii-a)

and/or the corresponding imide-group containing recurring unit:

(iii-b)

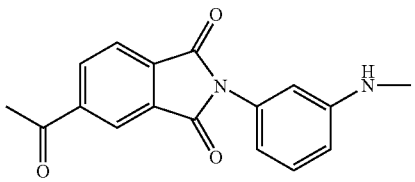

wherein the attachment of the two amide groups to the aromatic ring as shown in (iii-a) will be understood to represent the 1,3 and the 1,4 polyamide-amic acid configurations.

Recurring units (R2) are preferably recurring units (i) or a mix of recurring units (ii) and (iii).

Very preferably, the aromatic polyamic acid (A) comprises more than 90% mol of recurring units (R2). Still more preferably, it contains no recurring unit other than recurring units (R2).

Very preferably, the aromatic polyamic acid (A) comprises more then 90% mol of recurring (R2). Still more preferably, it contains no recurring unit other than recurring units (R2).

Exellent results were obtained with aromatic polyamic acid (A) consisting of recurring units (i) or of a mix of recurring units (ii) and (iii).

The mole percent of recurring units (R2) comprising at least one amic acid group is advantageously calculated as follows(eq.1):

$$\frac{[(R2-A) \text{ units}]_{mole\ fraction} + 2 \times [R2-B) \text{ units}]_{mole\ fraction} +}{[(R2-A)\text{units}]_{mole\ fraction} + [(R2-C)\text{units}]_{mole\ fraction} +} \times 100 \quad (eq.\ 1)$$
$$2 \times [(R2-B)\text{units}]_{mole\ fraction} + [(R2-D)\text{units}]_{mole\ fraction} +$$
$$[(R2-E)\text{units}]_{mole\ fraction}\}$$

where (R2-A), (R2-B), (R2-C), (R2-D), (R2-E) denote the recurring units ((R2) as above described.

At least preferably 55% mol, more preferably 60% mol of recurring units (R2) comprises at least one amic acid group.

The acid number (milligrams of KOH/gram) of the aromatic polyamic acid (A) is advantageously at least 100, more preferably at least 110 and still more preferably at least 120, and may be up to the theoretical acid number for a resin that comprises only amic acid units.

The number average molecular weight ($M_n$) of the aromatic polyamic acid (A) is advantageously at least 1000, preferably at least 1500, more preferably at least 2000.

The number average molecular weight ($M_n$) of the aromatic polyamic acid (A) is advantageously at most 20000, preferably at most 15000, more preferably at most 10000.

The inherent viscosity of the aromatic polyamic acid (A) is at least 0.1, preferably at least 0.15, more preferably at least 0.2 dl/g when measured as a 0.5% wt solution in N,N-dimethylacetamide at 30° C.

The aromatic polyamic acid (A) can be notably manufactured by a process including the polycondensation reaction between (I) at least one acid monomer chosen from pyromellitic anhydride, bis(3,4-dicarboxyphenyl)ether dianydride, trimellitic anhydride and trimellitic anhydride monoacid halides and (II) at least one comonomer chosen from diamines and diisocyanates.

Among the pyromellitic anhydride, bis(3,4-dicarboxyphenyl)ether dianydride, trimellitic anhydride and trimellitic anhydride monoacid halides, trimellitic anhydride monoacid chloride is preferred.

The comonomer comprises preferably at least one aromatic ring. Besides, it comprises preferably at most two aromatic rings. More preferably, the comonomer is a diamine. Still more preferably, the diamine is chosen from the group consisting of 4,4'-diaminodiphenylmethane, 4,4'-diaminodiphenylether, m-phenylenediamine, para-phenylenediamine, 4,4'-diaminodiphenylsulfone, 4,4'-diaminodiphenylsulfide, and mixtures thereof.

The polycondensation reaction is advantageously carried out under substantially anhydrous conditions in a polar solvent and at a temperature below 150° C., employing substantially stoichiometric quantities of the acid monomer and of the comonomer. A slight stoichiometric excess, usually from about 0.5 to about 5 mole %, of either monomer, preferably of the acid monomer, can be employed if desired in order to control molecular weight; alternatively a monofuctional reactant can be employed as an endcapping agent for this purpose, and to improve stability.

The aromatic polyamic acid (A) is advantageously isolated in solid form under mild conditions, preferably by being coagulated or precipitated from the polar reaction solvent by adding a miscible non-solvent, for example water, a lower alkyl alcohol or the like. Optionally, the solid resin may then be collected and thoroughly washed with water, and centrifuged or pressed to further reduce the water content of the solid without applying heat. Non-solvents other than water and lower alkyl alcohols are known and have been used in the art for precipitating aromatic polyamic acid (A) from solution including, for example, ethers, aromatic hydrocarbons, ketones and the like.

The water-based polymer composition of the invention comprises advantageously at least 0.01% wt. preferably at least 0.05% wt, more preferably at least 0.1% wt of aromatic polyamic acid (A) with respect to the total weight of the composition.

The water-based polymer composition of the invention comprises advantageously at most 50% wt, preferably at most 25% wt more preferably at most 15% wt of aromatic polyamic acid (A) with respect to the total weight of the composition.

Water-based polymer compositions comprising from 0.5 to 12% wt of aromatic polyamic acid (A) with respect to the total weight of the composition gave very satisfactory results.

The minimum amount of basic compound (B) employed will be approximately the stoichiometric amount required to neutralize the amic acid groups in the polymer, and preferably will be at least 0.8, more preferably at least 0.9 mole for each mole of amic acid groups in the aromatic polyamic acid (A).

The maximum amount of basic compound employed will be advantageously at most 5 moles, preferably 4.5 moles, more preferably at most 4.0 moles for each mole of amic acid groups in the aromatic polyamic acid (A).

It is known that water-based polymer compositions comprising aromatic polyamic acid (A) and containing greater than 100% of the stoichiometric or neutralizing amount of basic compound, based on the amount of amic acid groups present in the aromatic polyamic acid (A), are markedly more stable toward hydrolysis, hence formulations based on salt of aromatic polyamic acid (A) comprising similarly high levels of base will be preferred.

Still greater levels of basic compound may be conveniently employed without detrimentally affecting the coating properties of the water-based polymer composition.

In addition to improving the solution stability of these compositions, large excesses of the basic compound may be notably found to improve the rate of dissolution of the solid resin.

To neutralize part or all of the amic acid groups of the aromatic polyamic acid (A), the aromatic polyamic acid is advantageously reacted with a basic compound suitable for neutralizing carboxylic groups of R2 recurring units in aqueous medium.

Neutralizing and dissolving the aromatic polyamic acid (A) may be conveniently carried out in a single operation by adding the aromatic polyamic acid, preferably in solid form, to the requisite quantity of water containing the basic compound. Combining the aromatic polyamic acid (A) in solid from with an amount of a suitable basic compound effective to substantially neutralize the amic acid group and form the corresponding salt notably suffice to dissolve the aromatic polyamic acid (A) and there is no need of additional organic solvent or coalescing agent.

The amount of water employed will generally be sufficient to provide a solution containing from 0.5 to about 30% wt, preferably from about 1 to about 25% wto more preferably from about 1 to about 15% wt of aromatic polyamic acid (A).

Any convenient method of combining the components may be employed in neutralizing part or all of the amic acid group of the aromatic polyamic acid (A).

The aromatic polyamic acid (A) in solid form may be added in increments to a stirred mixture of the basic compound and water, continuing the stirring until the aromatic polyamic acid has been dissolved.

Alternatively, the basic compound can be added slowly to a stirred suspension of the aromatic polyamic acid (A) in water, with continued stirring until the solid dissolves.

As with any acid-base reaction, external cooling may be found necessary initially; subsequent warming and stirring may be desirable to complete dissolution of the aromatic polyamic acid (A) in a reasonable time period.

Preferably, the mixture of the aromatic polyamic acid (A) and the basic compound is heated at a temperature of at least 40° C., preferably of at least 45° C., more preferably of at least 50° C.

Suitable basic compounds (B) are notably all those can neutralize the amic groups of the recurring units R2 of the aromatic polyamic acid (A).

Inorganic and organic bases can be used for neutralizing part or all of the amic acid groups of the aromatic polyamic acid (A).

Non limitative examples of inorganic bases are notably alkaline and alkaline-earth metal hydroxides, such as NaOH, KOH, $Mg(OH)_2$, ammonia and the like.

Non limitative examples of organic bases are notably organic amines, such as aliphatic, aromatic, heterocyclic or heteroaromatic amines.

Preferably the basic compound (B) is a tertiary amine. The tertiary amine may be notably a tri-($C_1$-$C_4$ alkyl)amine such as, for example, trimethylamine N,N-dimethylethylamine, N,N-dimethylpropylamine, triethylamine, tributylamine or the like. Cyclic tertiary amines may also be found useful, as may any of the variety of well known, water-miscible, tertiary alkanol amines including N,N-dimethyletanolamine, diethyl-2-hydroxyethylamine and the like. Aromatic amines, such as N,N-dimethylaniline, pyridine, N-methylpyrrole can also be employed. Although polyfunctional amines such as N,N'-dimethylpiperidine, as well as N,N,N',N'-tetraalkyl-alkaline diamines and poly-N-alkylated alkalene triamines may also be found effective, the polyfunctional amines may tend to form associative crosslinks and gel, and will be less preferred.

Most preferred basic compound (B) is chosen from the group consisting of triethyl amine and N,N-dimethylethanolamine and mixture thereof.

Tertiary amines are notably known to increase the rate of thermal imidization and curing for aromatic polyamic acids, and may be effective in promoting rapid curing of aromatic polyamic acid films and coatings.

To the purposes of the invention, the term "organic solvent" (S), opposed to the basic compound (B), is intended to denote organic compounds that do not neutralize the amic acid group of the recurring units R2 for forming a salt.

Thus, the term organic solvent encompasses polar organic solvents able to dissolve the aromatic polyamic acid itself or other organic liquids miscible with water whose solubility parameter $δ_T$ fall within the range of 5-20.

Non limitative examples of polar organic solvents are N-methylpyrrolidone (NMP), N,N-dimethylformamide, N,N-dimethylacetamide, dimethylsulfoxide, cresylic acid, sulfolane, formamide or combinations thereof.

A discussion of solubility parameters can be found in, for instance, Kirk-Othmer, Encyclopedia of Chemical Technology, second edition (1963), pages 889-896. For the purposes of the present invention, the organic liquids useful as viscosity reducing agents are defined to have the following component parameters of the total solubility parameter $δ_T$:

| | |
|---|---|
| dispersion component, $δ_D$ | from 7.0 to 10.0 |
| polar component, $δ_P$ | from 2.0 to 11.0 |
| hydrogen bonding component, $δ_H$ | from 7.0 to 14.0 | wherein the equation 3, here below describes the relationship of the various components to the total solubility parameters:

$$δ_T^2 = δ_D^2 + δ_P^2 + δ_H^2 \quad\quad (eq.\ 3)$$

Among organic liquids whose solubility parameter $δ_T$ fall within the above mentioned range that have been used as viscosity reducing agents for water-based polymer compositions of the prior art, mention may be made of furfuryl alcohol, 1-butanol, 2-propanol, ethylene glycol, monomethyl ether, triethylene glycol, formic acid or combinations thereof.

The water-base polymer composition comprises the organic solvent (S) preferably in an amount not exceeding 15% wt more preferably not exceeding 10% wt, most preferably not exceeding 5% wt with respect to the weight of the aromatic polyamic acid (A).

Optionally, the water-based polymer composition can further comprise usual ingredients of coating compositions, notably: (i) dispersion agents; (ii) pigments like carbon black, silicates, metal oxides and sulfides; (iii) additives such as coating auxiliant or flow promoters; (iv) inorganic fillers like carbon fibers, glass fibers, metal sulfates, such as $BaSO_4$, $CaSO_4$, $SrSO_4$, oxides such as $Al_2O_3$ and $SiO_2$, zeolites, mica, talcum, kaolin; (v) organic fillers, preferably thermally stable polymers, like aromatic polycondensate; (vi) film hardener, like silicate compounds, such as metal silicate, e.g. aluminium silicate and metal oxides, such as titanium dioxide and aluminium oxide; (vii) adhesion promoters, like colloidal silica and a phosphate compound, such as metal phosphate, e.g. Zn, Mn or Fe phosphate.

Preferably, non-ionic surfactants are used as the dispersion agent in the primer composition, such as those selected from the group of alkylphenol ethoxylates, alkyl alcohol alkoxylates, fatty alcohol ethoxylates, fatty acid ethoxylates, fatty amide ethoxylates, fatty amine ethoxylates, sorbiton alkanoates, ethoxylated sorbiton alkanoates and the like, and combinations thereof.

The most preferred, dispersion agents are alkyl alcohol ethoxylates, alkyl alcohol ethoxy-propoxylates, alkyl phenol ethoxylates or combinations thereof Non-ionic surfactants available under the trade name TRITON™, which are octylphenol ethoxylates, and TERGITOL™, which are secondary alcohol alkoxylates, both available from Dow Chemical, Midland, Mich., USA may be used, particularly TRITON™ X-100, X-102, CF-21, DF-16 and X-45 and TERGITOL™ NP-8, TMN 100-X and MinFoam 1X. Among alkyl alcohol ethoxy-propoxylates ANTAROX 863 from Rhodia Geronazzo, Milan, Italy may by used. Surfactants available from Air Products PLC, Surrey, United Kingdom under the tradename DYNOL™, particularly DYNOL™ 604, may also be used as the dispersion agent in the primer composition.

Any type of pigments may used in the invention. Preferred pigments are, or will comprise, one or more of the following: titanium dioxide which is available from Whittaker, Clark & Daniels, South Plainfield, N.J., USA; Arctic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Engelhard Industries, Edison, N.J., USA.

Additives, such as chemicals helpful in coating formation or flow promoters, may be incorporated into the primer composition. Examples of these additives are LANCO™ Flow P10 available from Lubrizol, Wickliffe, Ohio, USA and MODAFLOW® Powder available from Solutia, St. Louis, Mo., USA.

The aromatic polycondensate is advantageously a high thermal resistant polymer. It comprises preferably more than 50% wt of recurring units that comprise amide, imide, ester, sulphide or ketone functionality. Polyphtalamides (available as AMODEL® from SOLVAY ADVANCED POLYMERS, L.L.C.), polyamides consisting of recurring units derived from adipic acid and meta-xylylenediamine (available as IXEF® from SOLVAY ADVANCED POLYMERS, L.L.C.), wholly aromatic polyesters (available as XYDAR® from SOLVAY ADVANCED POLYMERS, L.L.C.), polyphenylene sulphides (available as PRIMEF® from SOLVAY ADVANCED POLYMERS, L.L.C.), aromatic polyamideimides (available as TORLON® from SOLVAY ADVANCED POLYMERS, L.L.C.) and aromatic polyketones like those commonly known as PEEK or PEKK comply with this characteristic.

Another object of the invention is a process for manufacturing the water-based polymer composition as above described.

The water-based polymer composition can be advantageously manufactured by dispersing the polymer (P) as dry particles into the aqueous solution of the neutralized aromatic polyamic acid (A), prepared as above described, optionally with use of a dispersing agent. Other components of the water-based polymer composition, such as pigments and additives, may be added to the aqueous salt solution either before or after the polymer (P) is dispersed into the aqueous solution. Optionally, a high-pressure homogenizer, a colloid mill, a fast pump, a vibratory agitator or an ultrasound device may be used to reduce the particle size of the polymer (P) particles or of the other components while achieving an intimate mixture with the salt of aromatic polyamic acid (A) in solution (co-grinding).

As a first alternative, the aqueous solution of the salt of the aromatic polyamic acid (A) can be notably blended with the aqueous dispersion of the polymer (P) for manufacturing the water-based polymer compositions of the invention. The apparatus used for the milling operation and subsequent blending with the aqueous dispersion of the polymer (P) may be conventional. As non limitative example of mixing device, mention may be made notably of mixing tanks with agitator blades.

As a second alternative, the aromatic polyamic acid (A) and the basic compound (B) may be added to the polymer (P) dispersion, in order to form the salt of the aromatic polyamic acid (A) directly when preparing the composition. All the methods above described for obtaining the salt of the aromatic polyamic acid (A) may be notably applied, provided that an aqueous dispersion of the polymer (P) is used instead of simply water.

As a third alternative, the water-based polymer composition can be advantageously prepared by dispersing the polymer (P) into the aqueous salt solution of the aromatic polyamic acid (A) directly on the substrate. In this embodiment, the aqueous salt solution, which optionally comprises the dispersion agent and other components, such as pigment and additives, if desired, is applied to the substrate by conventional methods and the polymer (P) powder is dispersed into the aqueous solution on the substrate and then the substrate is baked as described below to cure the primer coat.

In a first preferred water-base composition according to the invention, the polymer (P) is a partially fluorinated fluoropolymer.

Any partially fluorinated fluoropolymer may be used in this first preferred water-based polymer composition.

Preferred partially fluorinated fluoropolymer are ethylene (E)/chlorotrifluoroethylene (CTFE) copolymers (ECTFE, herein after) and ethylene (E)/tetrafluoroethylene (TFE) copolymers (ETFE, hereinafter).

Particularly preferred are ethylene (E)/chlorotrifluoroethylene (CTFE) copolymers.

The ECTFE which can be used in the water-based polymer composition of the invention are notably high molecular weight, normally solid, thermoplastic polymers containing from 40 to 60% by moles of recurring units derived from ethylene and from 60 to 40% by moles of recurring units derived from CTFE.

Optionally, the ECTFE can also contain nominal amounts, up to 10% by moles, of copolymerizable comonomer other tan ethylene and chlorotrifluoroethylene, including propylene, isobutylene, vinyl fluoride, propylene, hexafluoride, tetrafluoroethylene, vinylidene fluoride, perfluoro-vinyl ether, acrylic acid and alkyl ester, methacrylic acid and alkyl ester, perfluoro alkyl ethylene, etc.

The melt index of the ECTFE is advantageously at least 0.1, preferably at least 0.5, more preferably at least 1.0 g/10 min.

The melt index of the ECTFE is advantageously at most 50, preferably at most 30, more preferably at most 25 g/10 min.

The melt index of ECTFE is measured in accordance with modified ASTM test No. 1238, run at 275° C., under a piston load of 2.16 kg.

The ECTFE has a melting point advantageously of at least 200° C. and at most 265° C.

Particularly adapted to the first preferred water-based polymer composition is ECTFE powder available from Solvay Solexis Inc., Thorofare, N.J., USA, under the tradename HALAR®.

The ECTFE may be prepared by processes known to those skilled in the arm as described, for example, in Hanford (U.S. Pat. No. 2,392,378), which shows copolymerization of ethylene with chlorotrifluoroethylene in a stirred aqueous medium at superatromospheric pressure using benzoyl peroxide as catalyst; in NUCLEONICS, September, 1964, pp. 72-74, disclosing formation of a high melting point (237° C.) 1:1 alternating copolymer of ethylene and chlorotrifluoroethylene prepared using a radiation at 0° C.; or British Patent No. 949,422, showing bulk copolymerization of ethylene with chlorotrifluoroethylene at temperatures between –80° C. to +50° C. using oxygen-activated alkyl boron catalyst; or Ragazzini et al. (U.S. Pat. Nos. 3,371,076 and 3,501,446), relating to methods for making ethylene/chlorotrifluoroethylene copolymers using oxygen-activated boron-containing catalysts and to products obtained by that process. About equimolar ethylene/chlorotrifluoroethylene copolymers having a melting point above 200° C. can also be prepared by batchwise bulk copolymerization of the monomer at temperatures of about 0° C., say between about –20 to +20° C., at superatmospheric pressure in an agitator-equipped pressure vessel by charging the vessel with liquid chlorotrifluoroethylene monomer and bubbling gaseous ethylene into this monomer, using organic peroxide-type initiators, such as trichloroacetyl peroxide and, if desired, adding small amounts of chain transfer agents, such as chloroform or heptane. The desired copolymer product is obtained as dispersion in the monomer.

The partially fluorinated fluoropolymer is advantageously available as a powder, preferably as a fine powder.

The partially fluorinated fluoropolymer has an average particle size of advantageously at most 125 µm, preferably of at most 55 µm, more preferably of at most 45 µm.

The partially fluorinated fluoropolymer has an average particle size of advantageously at least 0.2 µm preferably of at least 0.5 µm, more preferably of at least 1 µm.

Very good results were obtained with a partially fluorinated polymer having an average particle size between about 1 µm and 25 µm.

The first preferred water-based polymer composition comprises advantageously at least 0.1%, preferably at least 0.5% of aromatic polyamic acid (A) by weight of partially fluorinated fluoropolymer.

The first preferred water-based polymer composition comprises advantageously at most 50%, preferably at most 20% of aromatic polyamic acid (A) by weight of partially fluonzated fluoropolymer.

Preferably, first preferred water-base composition according to the invention also comprises at least one dispersion agents.

the first preferred water-based polymer composition comprises advantageously at least 0.5%, preferably at least 1% of the dispersion agent by weight of partially fluorinated fluoropolymer.

The first preferred water-based polymer composition comprises advantageously at most 20%, preferably at most 15% of the dispersion agent by weight of partially fluorinated fluoropolymer.

The first preferred composition can be made by dispersing the partially fluorinated fluoropolymer into an aqueous solution of the salt of the aromatic polyamic acid (A), optionally with use of the dispersing agent. In a preferred embodiment, a partially fluorinated fluoropolymer powder is used, particularly ECTFE, and is dispersed into an aqueous solution of the salt of polyamic acid (A), having sufficient quantities of partially fluorinated fluoropolymer powder, salt of aromatic polyamic acid and, optionally, dispersion agent so that the composition comprises from 0. 1% to 50%, by weight of the partially fluorinated polymer powder, of the aromatic polyamic acid (A) and, optionally, from 0.5% to 20%, by weight of the partially fluorinated polymer powder, of dispersing agent. Other components of the primer composition, such as pigments and additives, may be added to the aqueous solution either before or after the partially fluorinated polymer is dispersed into the aqueous solution.

As an alternative, the first preferred water-based polymer composition can be made by dispersing the partially fluorinated polymer powder into the aqueous salt solution of the aromatic polyamic acid, directly on a substrate to be coated. In this embodiment, the aqueous salt solution, which comprises optionally the dispersion agent and other components, such as pigment and additives, if desired, is applied to the substrate by conventional methods and the polymer powder is dispersed into the aqueous solution on the substrate and then the substrate is baked to cure the aromatic polyamic acid. Sufficient partially fluorinated fluoropolymer powder is applied to the aqueous solution so that the solution comprises from 0.1% to 50%, by weight of the partially fluorinated polymer, of the aromatic polyamic acid (A) and, optionally from 0.5% to 20%, by weight of the partially fluorinated polymer powder, of dispersing agent.

In a second preferred water-base composition according to the invention, the polymer (P) is a perfluorinated fluoropolymer.

Perfluorinated fluoropolymers advantageously comprise recurring units derived from tetrafluoroethylene ethylene (TFE).

The perfluorinated fluoropolymer comprises preferably more than 50% wt, more preferably more than 70% wt, still more preferably more than 80% wt of recurilng units derived from TFE.

Optionally, the perfluorinated fluoropolymers can also comprise recurring units derived from at least one other perfluorinated comonomer.

Non limitative examples of suitable fluorinated comonomers are notably;

$C_3$-$C_8$ perfluoroolefins, such as hexafluoropropene, perfluorohexene-1 and perfluorononene-1;

chloro- and/or bromo- and/or iodo-$C_2$-$C_6$ fluoroolefins, like chlorotrifluoroethylene;

perfluoroalkylvinylethers complying with formula $CF_2=CFOR_{f1}$ in which $R_{f1}$ is a $C_1$-$C_6$ perfluoroalkyl, e.g. $CF_3$, $C_2F_2$, $C_3F_7$;

$CF_2=CFOX_0$ (per)fluoro-oxyalkylvinylethers, in which $X_0$ is a $C_1$-$C_{12}$ (per)fluorooxyalkyl having one or more ether groups, like perfluoro-2-propoxy-propyl;

fluorodioxoles, especially perfluorodioxoles.

The second preferred water-based polymer composition comprises advantageously at least 0.1%, preferably at least 0.5%, more preferably at least 1% of aromatic polyamic acid (A) by weight of perfluorinated fluoropolymer.

The second preferred water-based polymer composition comprises advantageously at most 150%, preferably at most 125%, more preferably at most 100% of aromatic polyamic acid (A) by weight of perfluorinated fluoropolymer.

According to a first embodiment, in the second preferred water-based polymer composition the perfluorinated fluoropolymer may be either non melt-processible or melt-processible, To the purposes of the present invention, by the term "melt-processible" is meant that the fluoropolymer can be processed (i.e. fabricated into shaped articles such as films, fibers, tubes, wire coatings and the like) by conventional melt extruding, injecting or casting means. Such requires that the melt viscosity at the processing temperature be no more than $10^7$ poise, preferably in the range from $10^3$ to $10^7$ poise, and most preferably from $10^4$ to $10^6$ poise.

To the purposes of the present invention, by the term "non melt-processible" is meant that the fluoropolymer can not be processed by conventional melt extruding, injecting or casting means. This requirement corresponds to a melt viscosity at the processing temperature exceeding $10^7$ poise.

The melt viscosity of the perfluorinated fluoropolymers is measured according to ASTM D-1238-52T, using a cylinder, orifice and piston tip made of a corrosion-resistant alloy, charging a 5,0 g sample to the 9.53 inside diameter cylinder which is maintained at 380° C., extruding the sample 5 minutes after charging through a 2.10 mm diameter, 8.00 mm long square-edged orifice under a load (piston plus weight) of 5 kg. Melt viscosity is calculated in poise from the observable extrusion rate in grams per minute.

Non limitative examples of preferred non melt-processible pefluorinated fluoropolymer are notably PTFE homopolymers.

Examples of preferred PTFE homopolymers are notably ALGOFLON® F1111, POLYMIST® F5-A, POLYMIST® F-5A EX, ALGOFLON® L206, ALGOFLON® L203, ALGOFLON® L101X, ALGOFLON® L100X (commercially available from Solvay Solexis Inc.).

Non limitative examples of preferred melt-processible pefluorinated fluoropolymer are notably TFE copolymer containing at least 0.5% wt. preferably at least 1% wt of recurring units derived from perfluoroalkylvinylethers and TFE copolymers containing at least 5% wt, preferably at least 10% wt, more preferably at least 15% wt of recuning units derived from $C_3$-$C_8$ perfluotoolefins.

Examples of preferred melt-processible are notably HYFLON® MFA 6010, HYFLON® PFA 7010.

The perfluorinated fluoropolymer according to the first embodiment of the second preferred water-based polymer composition has an average particle size of advantageously at most 200 µm, preferably of at most 150 µm, more preferably of at most 125 µm.

The perfluorinated fluoropolymer according to the first embodiment of the second preferred water-based polymer composition has an average particle size of advantageously at least 0.5 µm, preferably of at least 1 µm, more preferably of at least 2 µm.

Particularly adapted for the first embodiment of the second preferred water-based polymer composition are notably the PTFE micropowders, such as those described in S. Ebnesajjad, Fluoroplastics, vol. 1: Non-melt processible fluoroplastics, PDL, William Andrew Corp., NY, 2000, pp.191-205, having an average particle size of advantageously at most 50 µm, and preferably at most 30µm.

According to a second embodiment, in the second preferred water-based polymer composition the perfluorinated fluoropolymer is melt-processible.

The melt-processible perfluorinated fluoropolymer is generally commercially available as dispersion of the polymer in water, which is the preferred form for the composition of the invention.

The melt-processible perfluorinated fluoropolymer can be advantageously provided as latex in water.

The perfluorinated fluoropolymer according to the second embodiment of the second preferred composition is advantageously obtained by any process comprising a polymerization step the product of which is a latex of polymer particles (called "primary particles"), i.e. a stable dispersion ("emulsion") of polymer particles having a mean diameter of below 1000 nm in a dispersion medium generally water.

The primary particles of the latex have usually a mean diameter in weight of at least 100 nm, preferably at least 150 nm, and more preferably at least 180 nm. In addition, they have a mean diameter in weight of preferably at most 400 = nm, and more preferably at most 300 nm.

However, in a particular embodiment, the primary particles of the latex can have a mean diameter in weight of below 100 nm. In addition they have a mean diameter in weight of preferably at least 60 nm, and more preferably at least 20nm.

In another particular embodiment the primary particles of the latex may have a bimodal distribution of particle size comprising a population of particles (a) with an weight average particle sizes in the range 180-400 nm and a population of particles (b) with an average particle sizes ranging from 20 to 60 nm; the ratio between the particle sizes of dispersion (b) compared with those of dispersion (a) being lower than 0,3.

Examples of processes comprising a polymerization step the product of which is a latex are those comprising an emulsion polymerization step (with the involvement of a water soluble initiator) or a microsuspension polymerization step (with the involvement of an oil soluble initiator). Processes comprising a microemulsion polymerization step as described in U.S. Pat. No. 6,297,334 are suitable for preparing primary particles having a mean diameter of below 100 nm.

A mild stirring is advantageously applied during the polymerization step to prevent the coagulation of the fluoropolymer primary particles.

The polymerization step takes place advantageously in the presence of an emulsifier, preferably in a sufficiently high amount to stabilize the emulsion of the fluoropolymer primary particles.

The emulsifier is preferably a fluorosurfactant. More preferably, the fluorosurfactant is chosen from:

$CF_3(CF_2)_{n1}COOM$, in which $n_1$ is an integer ranging from 4 to 10, preferably from 5 to 7, and more preferably being equal to 6; M represents H, $NH_4$, Na, Li or K, preferably $NH_4$;

$T(C_3F_6O)_{n0}(CFXO)_{m0}CF_2COOM$, in which T represents Cl or a perfluoroalkoxide group $C_kF_{2k+1}O$ with k=integer from 1 to 3, one F atom being optionally substituted by a Cl atom no is an integer ranging from 1 to 6; $m_0$ is an integer ranging from 0 to 6; M represents H, $NH_4$, Na, Li or K; X represents F or $CF_3$;

F—$(CF_2{-}_{CF2})_{n2}$—$CH_2$—$CH_2$—$SO_3M$, in which M represents H, $NH_4$, Na, Li or K, preferably H ; $n_2$ is an integer ranging from 2 to 5, preferably $n_2$=3;

A-$R_f$—B bifunctional fluorinated surfactants, in which A and B, equal to or different from each other, are —$(O)_p$ CFX—COOM ; M represents H, $NH_4$, Na, Li or K, preferably M represents $NH_4$; X=F or $CF_3$; p is an integer equal to 0 or 1; $R_f$ is a linear or branched perfluoroalkyl chain, or a (per)fluoropolyether chain such that the number average molecular weight of A-$R_f$—B is in the range 300-1,800.

A co-stabilizer is advantageously used in combination with the emulsifier. Paraffins with a softening point in the range 48° C.-62° C. are preferred as co-stabilizers.

The perfluorinated fluoropolymer according to the second embodiment of the second preferred composition is advantageously obtained by any process comprising an emulsion polymerization step.

A detailed description of processes comprising an emulsion polymerization step of fluorinated monomers is available notably in U.S. Pat. Nos. 4,016,345, 4,725,644 and 6,479,591, the whole content of which is herein incorporated by reference.

The water-soluble initiator is advantageously chosen from persulphates, permanganates and hydrosoluble organic peroxides, such as disuccinic acid peroxide.

The water-soluble initiator can be optionally used in combination with a reducing agent. An example thereof is $(NH_4)_2 Fe(SO_4)_2.6H_2O$ (Mohr's salt).

For the purposes of the present invention, according to the second embodiment of the second preferred composition the latex of the perfluorinated fluoropolymerca be used directly as obtained from the polymerization for the preparation of the water-based polymer composition. In this case, the latex has a solid content usually ranging from 20 to 30% wt.

Optionally, subsequent to the polymerization step, the latex can be concentrated to increase the perfluorinated fluoropolymer content up to at most 65% wt. The concentrated latex can be notably obtained with anyone of the processes known in the art. As an example, the concentrated latex can be notably obtained by the addition of a nonionic surfactant and by heating above the cloud point of the above-mentioned nonionic surfactant and separating the supernatant water phase from the polymer-rich phase. Otherwise, the concentrated latex can be obtained by an ultrafiltration method, well-known to those skilled in the art.

Optionally, the latex, either as obtained from the polymerization step, or after a concentrating step as described above, can be ether purified from the residues of anionic fluorinated surfactants used for the emulsion polymerization. In this case, a latex substantially free of anionic fluorinated surfactants is advantageously obtained.

The water-based polymer composition according to the second embodiment of the second preferred composition advantageously comprises at least 15% wt, preferably at least 40% wt, still more preferably at least 50% wt (related to the total dry weight of the composition) of the perfluorted fluoropolymer.

The water-based polymer compositions of this invention may be notably found useful for coating applications where organic solvents may not be desired or tolerated.

The water-based polymer compositions of this invention may be found particularly desirable in formulations intended for use in coating applications, providing an adherent, high strength continuous coating layer having improved toughness on a coated surface, exhibiting remarkable adhesion and film forming properties and enhancing the polymer (P) dispersion stability (before coating) and thermal stability during curing or baking of the coating.

Water-based polymer compositions of this invention thus may also be found particularly useful in providing formulations for use as primer for metal and glass, as enamels in container coating applications; as a binder layer for automotive finishes, to improve adhesion between existing layers of automotive finishes or with other metal finishes; as a chemically corrosion-resistant coating for metal or other substrates, as a binder layer for non-stick cookware; as a coating for tie bars for usage in cement; as a pretreatment coating for polymer films such as, for example, polyester, polyamide and polyimide film, when used in a metalizing operation; as an adhesive to various plastic or metallic film materials such as liquid crystal polymers and polyimides.

The water-based polymer composition as above described may be notably applied as primer or coating by spraying, brushing, roller-coating, dipping or by electrodeposition.

When used as a primer, if the substrate to be coated is metal, this is preferably pretreated by grit blasting, by flame spraying of metals or metal oxides or by frit-coating, although the composition can also advantageously applied to phosphated and chromated metals. If the substrate to be coated is glass, it is preferably first grit-blasted or frit-coated. Nevertheless, the water-based polymer compositions as above described can be also notably applied on smooth substrates, treated only by washing to remove grease and other contaminants which might interfere with adhesion, yielding good coating properties.

Otherwise, the water-based polymer composition of the invention may be used as topcoat, protective coating or finishing layer, especially non-stick finishes, optionally applied on a primer layer in mono- or multilayer structure.

The water-based polymer composition of the invention is usually applied to a thickness of about 1-50 μm (dry).

The primer or coating layer of the water-based polymer composition as above described is then air-dried and baked or cured at a temperature high enough to affect the imidization of the aromatic polyamic acid.

The imidization of the polyamic acid in the primer begins usually at around 180° C. and is notably accelerated when temperature is increased.

The baking drives off the volatile materials present in the coating composition, including water and optionally the salt moiety of the aromatic polyamic acid salt as the imide bond are formed during baking, when the basic compound is a volatile organic base.

The baking temperature for curing the water-based polymer compositions as above described is advantageously at least 180° C., preferably at least 200° C.

Preferred baking temperature is advantageously chosen as a function of the formulation of the water-based polymer composition.

The baking temperature for curing the water-based polymer compositions according to the first preferred composition as above described is advantageously at least 245° C., preferably from 245° C. to 270° C., and most preferably from 245° C. to 260° C. The baking temperature for cuing the water-based polymer composition according to the second preferred composition as above described is advantageously at least 245° C., preferably at least 250° C., more preferably at least 260° C., and advantageously at most 450° C., preferably at most 425° C., more preferably at most 410° C.

Top coatings on a substrate primed with the first preferred water-based polymer composition of the invention (i.e. top coated primed substrate) may also be cured at these temperature ranges.

The water-based polymer composition is generally baked from about 1 minute to about 30 minutes, preferably from about 5 minutes to about 20 minutes and most preferably from about 7 minutes to about 15 minutes. Each coating layer can be baked for the same amount of time; however, the typical baking time for top coat layers is generally dependent upon part/part mass and geometry.

The water-based polymer composition as above described has, several advantages over conventional compositions. During the drying and the baking there is no release of organic solvent particularly harmful for the environment The bake temperature is reduced which reduces the overall energy costs for coating substrates. Also, it is possible to obtain a high build coating using primers with lower viscosities as a result of the lower baking temperature. The preheating process for substrates, particularly metal substrates, is eliminated with the water-based polymer compositions of the invention.

Finally, a reduced amount of stabilizer in the top coat may be feasible because the top coat applied over the water-based polymer composition of the invention can be cured at a lower temperature and in a shorter time than with coatings applied over conventional primers.

Another object of the invention is thus an article comprising the water-based polymer composition as above described.

According to a first embodiment, the invention pertains to a coated film comprising the water-based polymer composition as above described.

According to a second embodiment, the invention also pertains to an intermediate layer (tie-layer) comprising the water-based polymer composition of the invention. This tie-layer may be further comprised in a multilayer structure.

Thus, it is still an object of the invention a multilayer structure comprising at least one layer comprising the water-based polymer composition as above described.

The water-based polymer composition according to the invention are particularly useful for coatings having high adhesion to substrates, and containing a low amount of organic solvent, unlike prior art coating and primer formulations, yielding the corresponding articles as above described; the water-based polymer compositions and the articles according to the invention are therefore more desirable for use where energy costs and environmental factors are important considerations.

The present invention is described in greater detail below by referring to the Examples; however, the present invention is not limited to these examples.

Characterization Methods:
Determination of Solid Content of Polyamide-Amic Acid Powder.

Approximately 0.5 g of the wet powder of polyamide-amic acid were precisely weighted in a pre-weighted aluminum weighting pan and placed in drying oven at 250° C. for 15 minutes. The sample weight was than recorded again after room temperature cooling in order to determine the percent solids of polymer resin used using the formula:

% solid={[(dry sample & pan wt)−(pan wt)]/(original sample wt)}×100

Determination of Latex Solids Content.

The polymer and surfactant content of the concentrated latex was determined by gravimetry. About 2 g of latex were put in a pre-weighted aluminum weighting pan and placed in drying oven at 105° C. for 2 hrs. The sample weight was than recorded again after room temperature cooling in order to determine the amount of water present in the latex. The aluminum pan containing the dry residual was than placed in oven at 400° C. for 10 minutes to decompose the organic surfactant and weighted again after cooling at room temperature. The polymer content of the latex was obtained from the formula:

Polymer %=100×(weight after 400° C. treament)/latex intial weight).

The surfactant content of the latex was obtained from the formula:

Surfactant %=[100×(weight after 105° C. treatment)/(latex initial weight)]−Polymer %.

Determination of Latex Particle Size

The average diameter of the particles was measured by an instrument based on laser light diffusion, specifically on photon correlation spectroscopy, equipped with a BROOKHAVEN® correlator 2030 AT model and an argon Laser light source having a wavelength of 514.5 nm by Spectra-Physics. The latex samples were diluted with water filtered on a 0.2 μm on MILLIPORE® filter. The scattering measurement was carried out at room temperature at an angle 90°. The diameter of the latex particles was obtained by the accumulating counter method.

Characterization of Polymer Powders

The particle size distribution was characterized as specified in ASTM D4895.

Thickness Measurement of the Coating

To evaluate the thickness of the coating, an electronic micrometer with a 0.001 mm tolerance was used. On a 2 meter long non sintered coated tape, the average thickness value was calculated by measuring the thickness in the middle of the tape, every 400 mm, for 6 times.

Adhesion Properties Determination

Two method were used as a function of the film thickness
Method 1: cross cut test as specified in ASTM D3359-87.
Method 2: Peel strength measurements, using an INSTRON® head from INSTRON® Corporation, Canton, Mass., USA were realized as detailed below, for determining the peel strength at a 90° angle.

Liquid Coating Application

Unless differently specified, water-based polymer compositions were applied on selected substrates by conventional air spray technique. The wet film was firstly dried in oven at 150° C. in order to eliminate the excess of water and than baked at temperature needed to obtain film formation as a function of the polymer present in the composition.

Electrostatic Spray Coating

For MFA powder coating an electrospray gun with a Voltage of 20 kV was used. For making 2 coat applications (primer+topcoat), after the application the powder the panel was baked in oven at 385° C. for 30 minutes in order to have proper polymer melting and film formation. In the case of high build coating cycle (5 or more topcoats) the first coat was baked at 405° C. for 20 minutes while further coats were baked at 330° C. in order to prevent thermal degradation of the polymer.

Sandoz Test (Water Vapor Resistances)

Coated panel submitted to the water vapor resistance test were kept horizontally on the top of the Sandoz cell where demineralized water is maintained at 95° C., so that the coated surface is continuously in contact with hot vapor in equilibrium with the condensate. Good vapor resistance is obtained when panels withstand the testing conditions for more than 20 days.

EXAMPLE 1

Two hundred grams of polyamide amic acid (TORLON® AI-50 from Solvay Advanced Polymers, available as wet powder with solid content=35% wt) were dispersed in a mixture of 485 grams of water and 50 grams of dimethyl ethanol amine. The dispersion was then warmed to a temperature between 60° C. to 70° C. Gradually, the solid dissolved into a brown aqueous solution containing about 11% by weight of polyamide amic acid. After cooling, this aqueous solution remained stable in storage at room temperature.

EXAMPLE 2 (COMPARATIVE)

A water-based polymer composition was made by adding 49.5 grams of ECTFE powder (HALAR®& 6014F ECTFE from Solvay Solexis, Inc.) with agitation, to a mixture containing 100 grams of water and 4.95 grams of dispersion agent, TRITON™ CF-21 from Dow Chemical. After agitation, the ECTFE was well dispersed in water.

A stainless steel coupon (4 inches wide by 4 inches long by $1/16$ inch wide) was blasted with sand to remove contaminants and roughen the surface, and then cleaned with a volatile organic solvent. A thin fiberglass fabric adhesive tape ($1/2$ inch wide and $1/2$ inch long) was applied to the center of one edge of the stainless steel coupon. A thin layer of the primer dispersion was then sprayed onto the coupon and baked at 260° C. for 15 minutes. Shortly after the primer was baked, ECTFE powder (HALAR® 6014F from Solvay Solexis, Inc.) was sprayed electrostatically onto the primer and baked for 15 minutes at 260° C. The process of applying ECTFE powder and baking for 15 minutes at 260° C. was repeated twice to apply additional ECTFE top coats. The final coating thickness on the stainless steel coupon was about 22 mils to about 30 mils.

After the initial bake of the primer coat, the primer had a brown color. The color, however, turned to dark brown after the baking cycles during application of the top coat layers. This indicated Nat ECTFE could not withstand such high heat exposure cycles without the presence of polyamide imide, and that the polyamide imide functions, at least, as a stabilizing agent for the ECTFE in the primer. This example and the results are addressed in Table 1.

EXAMPLES 3 to 18

For each example, a reaction vessel having 50 grams of water was charged with 50 grams of the aqueous solution from Example 1 to obtain a solution with 5.5% by weight of amine salt of polyamide arnic acid. ECTFE powder (HALAR® 6014F from Solvay Solexis, Inc.) having an average particle size less than 5 µm and a dispersion agent were added to the reaction vessel and agitated at ambient temperature to obtain a primer composition.

Sufficient ECTFE powder was added for each example so that the primer composition had 9 parts ECTFE to one part amine salt of polyamide amic acid. The type and amount of dispersion agent for each example is set forth in Table 1. For each example, a stainless steel coupon (4 inches wide by 4 inches long by $1/16$ inch wide) was blasted with sand to remove contaminants and roughen the surface, and then cleaned with a volatile organic solvent. A thin fiberglass fabric adhesive tape ($1/2$ inch wide and $1/2$ inch long) was applied to the center of one edge of the stainless steel coupon. A thin layer of the primer dispersion was then sprayed onto the coupon and baked at 260° C. for 15 minutes. Shortly after the primer was baked, ECTFE powder (HALAR® 6014F from Solvay Solexis, Inc.) was sprayed electrostatically onto the primer and baked for 15 minutes at 260° C. The process of applying ECTFE powder and baking for 15 minutes at 260° C. was repeated twice to apply additional ECTFE top coats.

After cooling each of the ECTFE coated stainless steel coupons overnight, each coating was cut along two sides of the fiberglass fabric tape to give a strip of ECTFE coating having a dimension of $1/2$ inches wide and 4 inches long. The thin fiberglass tape was then lifted from the coupon surface and gripped by an INSTRON® head from INSTRON® Corporation, Canton, Mass., USA. to measure peel strength.

The stainless steel coupons were held by a special INSTRON® attachment, which moved to keep each coated fiberglass strip perpendicular to the surface of each stainless steel coupon. Peel strength at a 90° angle for each example was recorded and the results for each example (Examples 3-18) are set forth in Table 1. The top coats for all of these examples had at least adequate adhesion to the primer and the coating was adequately adhered to the substrate.

EXAMPLES 19 to 21

The primer compositions for Examples 19 to 21 were prepared the same way as those described in Examples 3 to 18, except that the particle size of ECTFE powder was varied from 125 microns to less than 5 microns as set forth in Table 1. The primers for Examples 19, 20 and 21 were applied to stainless steel coupons with top coatings in the same manner as described for Examples 3 to 18, and also subjected to the peel strength test applying the procedures and equipment described above for Examples 3 to 18.

The results for the peel strength tests for Examples 19, 20 and 21 are set forth in Table 1. All of these examples had adequate adhesion to substrate and the top coat had adequate adhesion to the primer. These results indicate that the adhesion strength between the primer compositions and top coat improved with reduction in particle size of the partially fluorinated polymer, e.g. ECTFE, in the primer composition.

EXAMPLE 22

Twenty grams of the aqueous solution from Example 1 was charged with 10 grams of water in a reaction vessel to give an aqueous solution. Two grams of TERGITOL® MIN 1X dispersion agent was then added to this solution A stainless steel coupon (4 inches wide by 4 inches long by $1/16$ inch wide) was blasted with sand to remove contaminants and roughen the surface, and then cleaned with a volatile organic solvent A thin fiberglass fabric adhesive tape ($1/2$ inch wide and $1/2$ inch long) was applied to the center of one edge of the stainless steel coupon. A thin layer of the aqueous solution described above was then sprayed onto the coupon to wet the surface. Immediately, a thin layer of ECTFE powder was sprayed onto this wet surface and baked at 260° C. for 15 minutes to give a primer coat with 2.2 mils of thickness. Shortly after the primer was baked, ECTFE powder (HALAR® 6014F from Solvay Solexis, Inc.) was sprayed electrostatically onto the primer and baked for 15 minutes at 260° C. The process of applying ECTFE powder and baking for 15 minutes at 260° C. was repeated twice to apply additional ECTFE top coats.

After cooling the ECTFE coated stainless steel coupon overnight, the coating was cut along two sides of the fiberglass fabric tape to give a strip of ECTFE coating having a dimension of $1/2$ inches wide and 4 inches long. The thin fiberglass tape was then lifted from the coupon surface and gripped by an INSTRON® head, as described in Examples 3-18, to measure peel strength. The stainless steel coupon was held by a special INSTRON® attachment, as described in Examples 3-18, which moved to keep the coated fiberglass strip perpendicular to the surface of the stainless steel coupon. Peel strength at a 90° angle for the coating of this example was 92 lb/in with film rupture as failure mode, which is similar to the result obtained in Example 17.

An aluminum coupon (100 by 100 mm long by 2 mm thick) was blasted with sand to remove contaminants and to roughen the surface, and then cleaned with a volatile organic solvent. A 8-12 μm layer of the black composition was then sprayed onto the coupon as a primer and dried in oven at 150° C. The primer was over-coated with a HYFLON® MFA 6010 pow-

TABLE 1

| Example | Weight parts of amine salt of polyamic acid from Example 1 | Weight parts of partially fluorinated fluoropolymer (APS) | Dispersion agent | | 90° Peel | | Bake condition T (° C.)/ time(min) (per coat) | Comment |
|---|---|---|---|---|---|---|---|---|
| | | | Type | Weight parts | Strength, (lb/in) | Mode | | |
| 2 (comparative) | 0 | 9 (<5 μm) | Triton CF-21 | 0.9 | | | 260/15 | Turn to brown |
| 3 | 1 | 9 (<5 μm) | Triton X-102 | 0.135 | 71.3 | Film | 260/15 | |
| 4 | 1 | 9 (<5 μm) | Triton X-102 | 0.45 | 73.5 | Film | 260/15 | |
| 5 | 1 | 9 (<5 μm) | Triton X-102 | 0.9 | 71.5 | Film | 260/15 | |
| 6 | 1 | 9 (<5 μm) | Triton X-102 | 1.35 | 81.4 | Film | 260/15 | |
| 7 | 1 | 9 (<5 μm) | Triton CF-21 | 0.135 | 70 | Film | 260/15 | |
| 8 | 1 | 9 (<5 μm) | Triton CF-21 | 0.45 | 89.2 | Film | 260/25 | |
| 9 | 1 | 9 (<5 μm) | Triton CF-21 | 0.9 | 76.8 | Film | 260/25 | |
| 10 | 1 | 9 (<5 μm) | Triton CF-21 | 1.35 | 71 | Film | 260/15 | |
| 11 | 1 | 9 (<5 μm) | Triton X-45 | 0.135 | 46.2 | Film | 260/15 | |
| 12 | 1 | 9 (<5 μm) | Triton X-45 | 0.45 | 50.8 | Film | 260/25 | |
| 13 | 1 | 9 (<5 μm) | Triton X-45 | 0.9 | 80.8 | Film | 260/25 | |
| 14 | 1 | 9 (<5 μm) | Triton X-45 | 1.35 | 80 | Film | 260/15 | |
| 15 | 1 | 9 (<5 μm) | Tergitol MIN 1X | 0.135 | 59.8 | Film | 260/15 | |
| 16 | 1 | 9 (<5 μm) | Tergitol MIN 1X | 0.45 | 89.9 | Film | 260/25 | |
| 17 | 1 | 9 (<5 μm) | Tergitol MIN 1X | 0.9 | 75.1 | Film | 260/25 | |
| 18 | 1 | 9 (<5 μm) | Tergitol MIN 1X | 1.35 | 82.3 | Film | 260/15 | |
| 19 | 1 | 9 (<5 μm) | Triton CF-21 | 0.9 | 85 | Film | 260/15 | |
| 20 | 1 | 9 (10–20 μm) | Triton CF-21 | 0.9 | 73 | Film | 260/15 | |
| 21 | 1 | 9 (<45 μm) | Triton CF-21 | 0.9 | 61 | Film | 260/15 | |

EXAMPLE 23

45.55 grams of aromatic polyamic acid (TORLON® AI-50 from Solvay Advanced Polymers, available as wet powder with solid content=40%) was dispersed in a mixture of 145.35 grams of water and 9.11 grams of triethyl amine (TEA). The dispersion was then kept at 50° C. for 3 hrs. Gradually, the solid dissolved into a brown aqueous solution containing about 9% by weight of polyamide-amic acid salt. After cooling, this aqueous solution is stable in storage at room temperature.

EXAMPLE 24

33.82 grams of aromatic polyamic acid (TORLON® AI-30 from Solvay Advanced Polymers, available as wet powder with solid content=34%) was dispersed in a mixture of 159.42 grams of water and 6.76 grams of triethyl amine (TEA). The dispersion was then kept at 50° C. for 3 hrs. Gradually, the solid dissolved into a brown aqueous solution containing about 6% by weight of polyamide-amic acid salt. After cooling, this aqueous solution is stable in storage at room temperature.

EXAMPLE 25

49.0 grams of the aqueous solution from Example 23 was mixed with 48.0 grams of MFA concentrated dispersion (HYFLON® D5010 from Solvay Solexis, 55% solids in weight, containing 4% of nonionic surfactant) under gentle stirring. While keeping the mixture under sting, 5.0 grams of a Channel Black paste in water (30% solids in weight) were added to the mixture in order to have a black colored paint. The obtained water based composition was homogeneous and stable.

der applied by electrostatic spray coating to obtain a two coatings layer. The panel was baked at 385° C. for 30 minutes to develop a film coating 70 μm thick.

After cooling the MFA coated coupon, the film was inspected by optical microscope (Leiz SM-.LUX) at 100× magnification and the adhesion was checked by cross cut test: the coating was continuous and no delamination was found either at the primer-substrate (P/S) or at the topcoat-primer (T/P) interface. This example and the results are addressed in Table 2.

EXAMPLE 26

50.0 grams of the aqueous solution from Example 24 were mixed with 30.9 grams of MFA concentrated dispersion (HYFLON® D5010 from Solvay Solexis, 55% solids in weight, containing 4% of nonionic surfactant) under gentle stirring. While keeping the mixture under stirring, 3.3 grams of a Channel Black paste in water (30% solids in weight) were added to the mixture in order to have a black colored paint. The obtained water based composition was homogeneous and stable.

A carbon steel coupon (100 by 100 mm long by 3 mm thick) was blasted with sand to remove contaminants and to roughen the surface, and then cleaned with a volatile organic solvent. A 15-20 μm layer of the black composition was then sprayed onto the coupon as a primer and dried in oven at 150° C. The primer was over-coated with a HYFLON® MFA 6010 powder applied by electrostatic spray coating to obtain a two coats layer. The panel was baked at 385° C. for 30 minutes to develop a film coating 85 μm thick.

After cooling the MFA coated coupon, the film was inspected by optical microscope (Leiz SM-.LUX) at 100× magnification and the adhesion was checked by cross cut test:

the coating was continuous and no delamination was found either at the primer-substrate (P/S) or topcoat-primer (T/P) interface.

This example and the result are addressed in Table 2.

EXAMPLE 27

100.0 grams of the aqueous solution from Example 24 were mixed with 25.5 grams of MFA concentrated dispersion (HYFLON® D5010 from Solvay Solexis, 55% solids in weight, containing 4% of nonionic surfactant) under gentle strro, While keeping the mixture under stirring, 4.3 grams of a Channel Black paste in water (30% solids in weight) were added to the mixture in order to have a black colored paint. The obtained water based composition was homogeneous and stable.

A carbon steel coupon (100 by 100 mm long by 3 mm thick) was blasted with sand to remove contaminants and to roughen the surface, and then cleaned with a volatile organic solvent. A thin fiberglass fabric adhesive tape (½ inch wide and ½ inch long) was applied to the center of one edge of the stainless steel coupon. A 20-25 µm layer of the black composition was then sprayed onto the coupon as a primer. Immediately after the application of the primer the panel was overcoated with a HYFLON® MFA 6010 powder applied by electrostatic spray coating, using a powder on wet process. The panel was than baked at 405° C. for 20 minutes to provide proper stratification of the two coats layer and curing of the polyamide-imide. The process of applying MFA powder was repeated five times baking each layer for 15 minutes at 330° C. to apply additional MFA top coats. The final coating thickness on the stainless steel coupon was about 400 µm.

After cooling the MFA coated stainless steel coupon overnight, each coating was cut along two sides of the fiberglass fabric tape to give a strip of MFA coating having a dimension of ½ inches wide and 4 inches long. The thin fiberglass tape was then lifted from the coupon surface and gripped by an INSTRON® head, to measure peel strength. The stainless steel coupons were held by a special INSTRON® attachment, which moved to keep each coated fiberglass strip perpendicular to the surface of each stainless steel coupon. The results of the 90° angle peel strength are set in Table 2.

EXAMPLE 28

The same composition and procedure used in Example 27 were used except that, after the first powder on wet application of HYFLON® MFA 6010 and backing at 405° C. for 20 minutes, the process of applying MFA powder was repeated ten times, baking each layer for 15 minutes at 330° C. to apply additional MFA top coats to reach a final coating thickness on the stainless steel of about 725 µm. After cooling the MFA coated coupon, the adhesion was checked by the 90° angle peel strength test, as described above, and the results are addressed in Table 2.

EXAMPLE 29

100.0 grams of the aqueous solution from Example 24 were mixed with 11 grams of MFA concentrated dispersion (HYFLON® D5010 from Solvay Solexis, 55% solids in weight, containing 4% of nonionic suactant) under gentle stirring. While keeping the mixture under sring, 2 grams of a Channel Black passe in water (30% solids in weight) were added to the mixture in order to have a black colored paint The obtained water based composition was homogeneous and stable.

A carbon steel coupon (100 by 100 mm long by 3 mm thick) was blasted with sand to remove contaminants and to roughen the surface, and then cleaned with a volatile organic solvent. A thin fiberglass fabric adhesive tape (½ inch wide and ½ inch long) was applied to the center of one edge of the stainless steel coupon. A 20-25 µm layer of the black composition was then sprayed onto the coupon as a primer. Immediately after the application of the primer the panel was overcoated with a HYFLON® MFA 6010 powder applied by electrostatic spray coating, using a powder on wet process. The panel was than baked at 405° C. for 20 minutes to provide proper stratification of the two coats layer and curing of the polyamide-imide. The process of applying MFA powder was repeated five times baking each layer for 15 minutes at 330° C. to apply additional MFA top coats. The final coating thickness on the stainless steel coupon was about 390 µm.

After cooling the MFA coated stainless steel coupon overnight, each coating was cut along two sides of the fiberglass fabric tape to give a strip of MFA coating having a dimension of ½ inches wide and 4 inches long. The thin fiberglass tape was then lifted from the coupon surface and gripped by an INSTRON® head, to measure peel strength. The stainless steel coupons were held by a special INSTRON® attachment, which moved to keep each coated fiberglass strip perpendicular to the surface of each stainless steel coupon. The results of the 90° angle peel strength are set in Table 2.

EXAMPLE 30

100 grams of the aqueous solution from Example 23 were charged with 50 grams of water in a reaction vessel to give an aqueous solution with 6% by weight of polymic acid. Next 100 grams of PTFE powder (POLYMIST® F5A from Solvay Solexis), were slowly, in about 15 minutes, introduced into the solution at room temperature. The obtained dispersion was kept under sting for another 5 minutes after adding the whole amount of the PTFE powder. A homogeneous dispersion was obtained. The obtained dispersion was stable after 2 hours without visible signs of sedimentation.

The obtained aqueous dispersion was applied by air gun spraying to aluminum panel (100 by 100 mm long by 2 mm thick) that had been previously cleaned with a volatile organic solvent. The panel was firstly dried at 100° C., a homogeneous dry coated layer was observed. The dried coated panel was sintered at 400° C. for 10 minutes obtaining a homogeneous coating characterized by a thickness of 30 µm.

After cooling the coated coupon was inspected by optical microscope (Leiz SM-.LUX) at 100× magnification and the adhesion was checked by cross cut test: the coating was continuous and no delamination was observed. This example and the results are addressed in Table 2.

EXAMPLE 31

The same composition and coating procedure described in the Example 30 were repeated except at the dried panel was baked in oven at 260° C. for 2 hours in order to cure the aromatic polyamic acid. The obtained coating was homogeneous wit adequate adhesion on the metal.

After cooling the coated coupon was inspected by optical microscope (Leiz SM-LUX) at 100× magnification and the adhesion was checked by cross cut test: the coating was continuous and no delamination was observed. This example and the results are addressed in Table 2.

EXAMPLE 32

100 grams of the aqueous solution from Example 23 were charged with 50 grams of water in a reaction vessel to give an aqueous solution with 6% by weight of aromatic polyamic acid Next, 80 grams of a PAI powder (TORLON® 4000TF from Solvay Advanced Polymers), were slowly, in about 15 minutes, introduced into the solution at room temperature. The obtained dispersion was kept under stirring for another 5 minutes after adding the whole amount of the PAI powder. A homogeneous dispersion was obtained showing good stability after 2 hours without visible signs of sedimentation.

The obtained aqueous dispersion was applied by air gun spraying to an aluminum panel (100 by 100 mm long by 2 mm thick) that had been previously cleaned with a volatile organic solvent. The panel was firstly dried at 100° C., and a homogeneous dry coated layer was obtained. The dried coated panel was cured at 250° C. for 2 hours obtaining a homogeneous coating characterized by a thickness of 20 µm.

After cooling the coated coupon was inspected by optical microscope (Leiz SM-.LUX) at 100× magnification and the adhesion was checked by cross cut test: the coating was continuous and no delamination was observed. This example and the results are addressed in Table 2.

EXAMPLE 33 (COMPARATIVE)

The procedure disclosed by Concannon in U.S. Pat. No. 4,014,834 was used to prepare a water based solution of a polyamic acid characterized by an acid content of 80 mg KOH/g (TORLON® AI-10 from Solvay Advanced Polymers).

15 grams of polyamic acid TORLON® AI-10 were dispersed in a mixture of 50 grams of water, 4 grams of diethyl ethanol amine, 2 grams of triethyl amine, 18 grams of furfuryl alcohol and 10 grams of N-methyl pirrolidone (NMP). The dispersion was then kept at 50° C. for 4 hrs. Gradually, the solid dissolved into a brown aqueous solution containing about 15% by weight of polyamic acid and 30% of organic solvents. After cooling, this aqueous solution was stable in storage at room temperature.

EXAMPLE 34 (COMPARATIVE)

15 grams of a polimide-amic acid characterized by an acid content of 80 mg KOH/g (TORLON® AI-10 from Solvay Advanced Polymers) were dispersed in 80 grams of N-methyl pirrolidone (NMP). The dispersion was then kept at 50° C. for 1 hr. Gradually, the solid dissolved into a brown solution containing about 15% by weight of solids. After cooling, this aqueous solution was stable in storage at room temperature.

EXAMPLE 35 (COMPARATIVE)

35.0 grams of the water/NMP solution from Example 34 was mixed with 9.5 grams of MFA concentrated dispersion (HYFLON® D5010 from Solvay Solexis, 55% solids in weight, containing 4% of nonionic surctant) under gentle stirring. While stirring, 1.75 grams of a Channel Black paste in wter (30% solids in weight) were added to the mixture in order to have a black colored paint. The obtained water based composition was homogeneous but the viscosity was very high, indicating some stability problem.

The black composition was sprayed onto a carbon steel coupon (100 by 100 mm long by 3 mm thick), that was previously blasted with sand to remove contaminants and to roughen the surface and cleaned with a volatile organic solvent. The so-obtained 15-20 µm primer layer was not homogeneous and spots were detected on the surface. After dying in oven at 150° C. the primer was over-coated with a HYFLON® MFA 6010 powder applied by electrostatic spray coating to obtain a two coats layer. The panel was baked at 385° C. for 30 minutes to develop a film coating 60 µm thick.

After cooling the MFA coated coupon, the film was inspected by optical microscope (Leiz SM-.LUX) at 100× magnification and the adhesion was checked by cross cut test the adhesion was not satisfactory and the panel failed at the Sandoz test. This example and the results are addressed in Table 2.

EXAMPLE 36 (COMPARATIVE)

45.0 grams of the NMP solution from Example 35 were mixed wit 6.7 grams of MFA powder (HYFLON® 6010 from Solvay Solexis, 55% solids in weight, containing 4% of nonionic surfactant) and the mixture was agitated as done in the Example 31. The NMP solution did not wet the powder and no dispersion was obtained.

EXAMPLE 37-39 (COMPARATIVE)

Water dispersion of HYFLON® MFA 6010 and POLYMIST®F5A from Solvay Solexis, TORLON® 4000TF from Solvay Advanced Polymers powders were prepared by adding 40 grams of the polymer powder to a 5% solution of a non ionic surfactant (Triton X100 from Dow). The mixtures were agitated as done in the Example 31. All the water dispersions powders that have been obtained showed fast settling.

The polymer dispersions were sprayed on aluminum panels (106 by 100 mm long by 2 mm thick) that have been previously cleaned with a volatile organic solvent. The coated panels were dried at 100° C., but the dried powders did not sticks on the aluminum and it was found impossible to obtain continuous coated layers.

TABLE 2

| N° | Polyamic acid (A) type | medium | Polymer (P) type | form | Surfactant (% wt in final composition) | Weight ratio polymer (P)/atomatic polyamic acid (A) (wt/wt) | substrate | Top-coat | Coating thickness (µm) | Adhesion Test (ASTM D3359-87) | Peel strength (lbs/ln) | Sandoz Test |
|---|---|---|---|---|---|---|---|---|---|---|---|---|
| 25 | Torlon® AI-50 | water | MFA(§) | latex | 2% | 85/15 | Al | MFA(°) | 70 | passed | — | passed |
| 26 | Torlon® AI-30 | water | MFA(§) | latex | 2.9% | 85/15 | steel | MFA(°) | 85 | passed | — | passed |
| 27 | Torlon® AI-30 | water | MFA(§) | latex | 0.8% | 70/30 | steel | MFA(°) | 400 | — | 9.1 | — |

TABLE 2-continued

| N° | Polyamic acid (A) type | medium | Polymer (P) type | form | Surfactant (% wt in final composition) | Weight ratio polymer (P)/atomatic polyamic acid (A) (wt/wt) | substrate | Top-coat | Coating thickness (μm) | Adhesion Test (ASTM D3359-87) | Peel strength (lbs/ln) | Sandoz Test |
|---|---|---|---|---|---|---|---|---|---|---|---|---|
| 28 | Torlon ® AI-30 | water | MFA(§) | latex | 0.8% | 70/30 | steel | MFA(o) | 725 | — | 11 | — |
| 29 | Torlon ® AI-30 | water | MFA(§) | latex | 0.4% | 50/50 | steel | MFA(o) | 390 | — | 10.06 | — |
| 30 | Torlon ® AI-50 | water | PTFE(‡) | powder | — | 100/10 | Al | — | 30 | passed | — | — |
| 31 | Torlon ® AI-50 | water | PTFE(‡) | powder | — | 100/10 | Al | — | 30 | passed | — | — |
| 32 | Torlon ® AI-50 | water | PAI(†) | powder | — | 90/10 | Al | — | 20 | passed | — | — |
| 35 (comp) | Torlon ® AI-10 | water/ NMP | MFA(§) | latex | 0.8% | 50/50 | steel | MFA(o) | 60 | failed | — | failed |
| 36 (comp) | Torlon ® AI-10(*) | NMP | MFA(o) | powder | — | | | | | | | |
| 37 (comp) | — | water | MFA(o) | powder | 5% | (**) | Al | | | | | |
| 38 (comp) | — | water | PTFE(‡) | powder | 5% | (**) | Al | | | | | |
| 39 (comp) | — | water | PAI(†) | powder | 5% | (**) | Al | | | | | |

(§) MFA HYFLON ® D5010 (APS = 180 nm);
(‡) PTFE POLYMIST ® F5A (APS = 4.5 μM);
(†) PAI TORLON ® 4000TF;
(o) MFA HYFLON ® 6010;
(*) not miscible;
(**) non film forming composition.

The above written description of the invention provides a manner and process of making and using it such that any person skilled in this art is enabled to make and use the same, this enablement being provided in particular for the subject matter of the appended claims, which make up a part of the original description.

As used above, the phrases "selected from the group consisting of", "chosen from", and the like include mixtures of the specified materials.

All references, patents, applications, tests, standards, documents, publications, brochures, texts, articles, etc. mentioned herein are incorporated herein by reference. Where a numerical limit or range is stated, the endpoints are included. Also, all values and subranges within a numerical limit or range are specifically included as if explicitly written out.

As used herein, where a certain polymer is noted as being "obtained from" or "comprising", etc. one or more monomers (or monomer units) this description is of the finished polymer material itself and the repeating units therein that make up, in whole or part, this finished product. One of ordinary skill in the art understands that, speaking precisely, a polymer does not include individual, unreacted "monomers", but instead is made up of repeating units derived from reacted monomers.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The invention claimed is:

1. A water-based polymer composition, comprising:
particles of at least one halogenated polymer (P) in an amount of from 5 to 50% by weight based on the total weight of the composition, wherein the halogenated polymer (P) is a fluoropolymer consisting of recurring units derived from a fluorinated monomer and at least one hydrogenated comonomer;
at least one aromatic polyamic acid (A) comprising recurring units (R2), wherein more than 50% mol of said recurring units (R2) comprise at least one aromatic ring and at least one of an amic acid group and an imide group, further wherein:
in more than 50% mol of said recurring units (R2) comprising at least one amic acid group, part or all of the amic acid groups are neutralized by at least one basic compound (B), wherein the aromatic polyamic acid (A) has an acid number of at least 100 mgKOH/gram and is present in an amount of 0.5 to 12% by weight based on the total weight of the composition;
water; and
optionally, at least one organic solvent (S) wherein the total amount of the organic solvent is less than 20% by weight with respect to the weight of the aromatic polyamic acid.

2. The composition according to claim 1, wherein the recurring units (R2) are at least one selected from the group consisting of (R2-A)

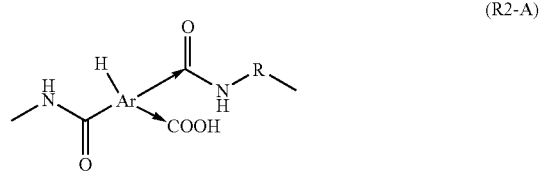

(R2-B)

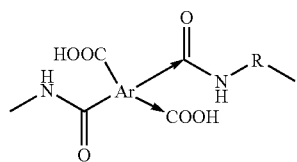

(R2-C)

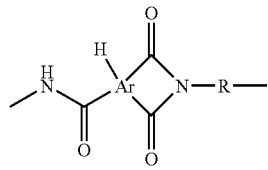

(R2-D)

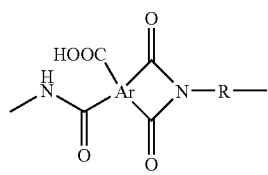

(R2-E)

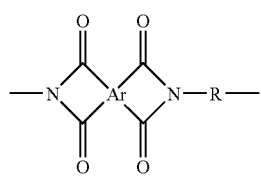

wherein:
the symbol → denotes isomerism so that in any recurring unit within the polyamic acid structure the groups to which the arrows point may exist as shown or in an interchanged position Ar is at least one selected from the group consisting of:

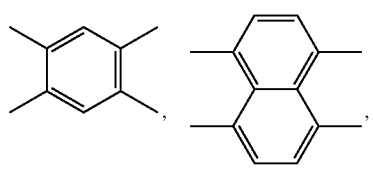

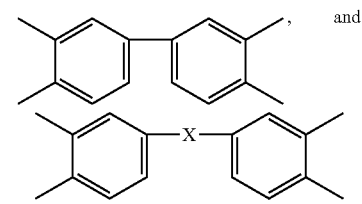

wherein X is at least one selected from the group consisting of

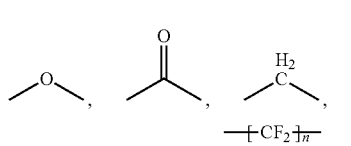

with n=0, 1, 2, 3, 4 or 5,

R is at least one selected from the group consisting of:

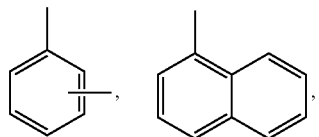

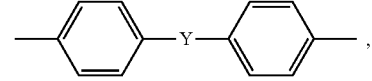

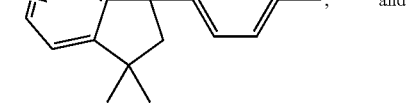

and

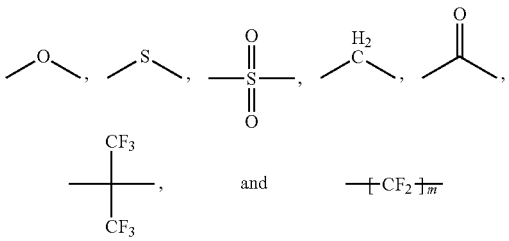

wherein Y is at least one selected from the group consisting of

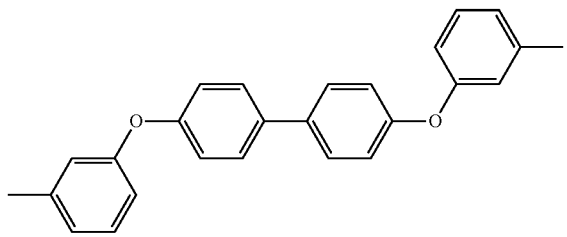

with n =0, 1, 2, 3, 4 or 5.

3. The composition according to claim 2, wherein the recurring units (R2) are at least one selected from the group consisting of (i)

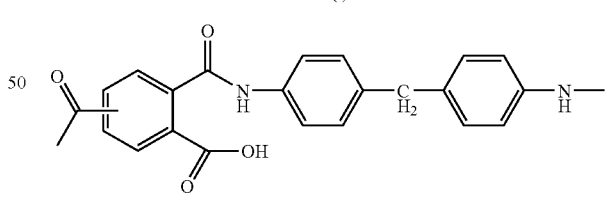

and the corresponding imide-group containing recurring unit:

(i-b)

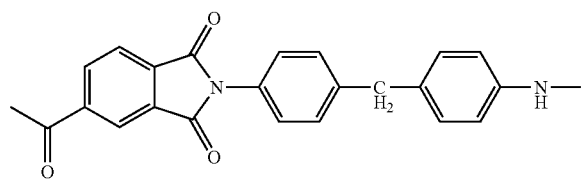

wherein the attachment of the two amide groups to the aromatic ring as shown in (i-a) represents the 1,3 or the 1,4 polyamide-amic acid configurations;

(ii)

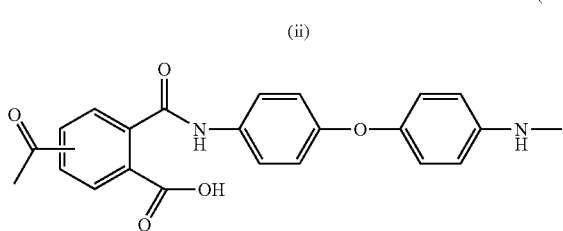

(ii-a)

and the corresponding imide-group containing recurring unit:

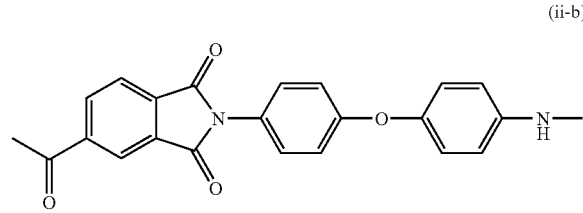

(ii-b)

wherein the attachment of the two amide groups to the aromatic ring as shown in (ii-a) represents the 1,3 or the 1,4 polyamide-amic acid configurations; and (iii)

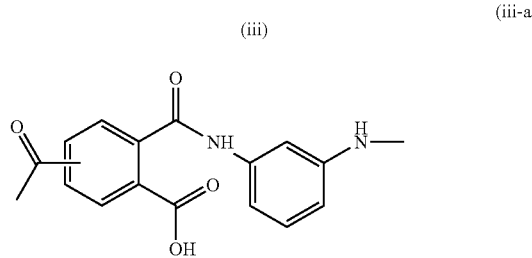

(iii-a)

and the corresponding imide-group containing recurring unit:

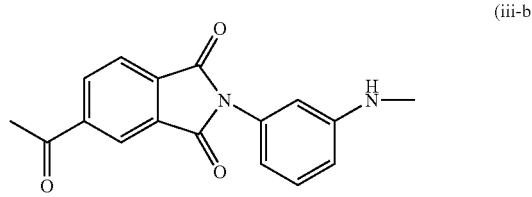

(iii-b)

wherein the attachment of the two amide groups to the aromatic ring as shown in (iii-a) represents the 1,3 or the 1,4 polyamide-amic acid configurations.

4. The composition according to claim 3, wherein the aromatic polyamic acid consists of recurring units (i) or of a mix of recurring units (ii) and (iii).

5. The composition according claim 1, wherein the basic compound (B) is a tertiary amine.

6. The composition according to claim 5, wherein the tertiary amine is selected from the group consisting of triethyl amine, N,N-dimethylethanol amine and mixtures thereof.

7. The composition according to claim 1, wherein the halogenated polymer (P) is an ethylene/chlorotrifluoroethylene copolymer.

8. The composition according to claim 7, wherein the halogenated polymer (P) comprises from 40-60 mol % of recurring ethylene units and from 60-40 mol % of recurring chlorotrifluoroethylene units.

9. The composition according to claim 1, wherein the composition comprises at least 0.1% and at most 50% of aromatic polyamic acid (A) by weight of the halogenated polymer (P).

10. The composition according to claim 1, wherein the composition further comprises at least one dispersion agent.

11. The composition according to claim 10, wherein the composition comprises at least 0.5% and at most 20% of dispersion agent by weight of the halogenated polymer (P).

12. The composition according to claim 1, wherein the halogenated polymer (P) is an ethylene/chlorotrifluoroethylene copolymer and the polyamic acid is polyamide amic acid.

13. The composition according to claim 1, wherein the halogenated polymer (P) is at least one selected from the group consisting of an ethylene/chlorotrifluoroethylene copolymer and an ethylene/tetrafluoroethylene copolymer.

14. The composition according to claim 13, wherein the halogenated polymer (P) is present in the composition in the form of particles having an average particle size of from 20 nm to 200 µm.

15. The composition according to claim 1, wherein the total amount of the organic solvent is less than 5% by weight with respect to the weight of the aromatic polyamic acid.

16. The composition according to claim 1, wherein the halogenated polymer (P) is an ethylene/chlorotrifluoroethylene copolymer having an average particle size of less than 5 micron.

17. A water-based polymer composition, comprising:
particles of at least one halogenated polymer (P) in an amount of from 5 to 50% by weight based on the total weight of the composition, wherein the halogenated polymer (P) is a fluoropolymer consisting of recurring units derived from a fluorinated monomer and at least one hydrogenated comonomer;
at least one aromatic polyamic acid (A) comprising recurring units (R2), wherein more than 50% mol of said recurring units (R2) comprise at least one aromatic ring and at least one of an amic acid group and an imide group, further wherein:
in more than 50% mol of said recurring units (R2) comprising at least one amic acid group, part or all of the amic acid groups are neutralized by at least one basic compound (B), wherein the aromatic polyamic acid (A) has an acid number of at least 100 mgKOH/gram and is present in an amount of 0.5 to 12% by weight based on the total weight of the composition;
water; and
optionally, at least one organic solvent (S) wherein the total amount of the organic solvent is less than 20% by weight with respect to the weight of the aromatic polyamic acid,
wherein the halogenated polymer (P) has an average particle size of less than 5 micron.

18. An article comprising the composition according to claim 1.

19. A coated film comprising the composition according to claim 1.

20. An intermediate layer (tie-layer) comprising the composition according to claim 1.

21. The tie-layer of claim 20, characterized in that it is comprised in a multilayer structure.

22. A multilayer structure comprising at least one layer comprising the composition according to claim 1.

* * * * *

UNITED STATES PATENT AND TRADEMARK OFFICE
CERTIFICATE OF CORRECTION

PATENT NO. : 8,063,135 B2
APPLICATION NO. : 10/902007
DATED : November 22, 2011
INVENTOR(S) : Lin et al.

It is certified that error appears in the above-identified patent and that said Letters Patent is hereby corrected as shown below:

On Title page 1, item (12):
"Shiow-Ling et al." should read --Lin et al.--

On Title page 1, item (75):
"Lin Shiow-Ling" should read --Shiow-Ching Lin--

On page 17, column 32, lines 30-40:
"wherein Y is at least one selected from the group consisting of

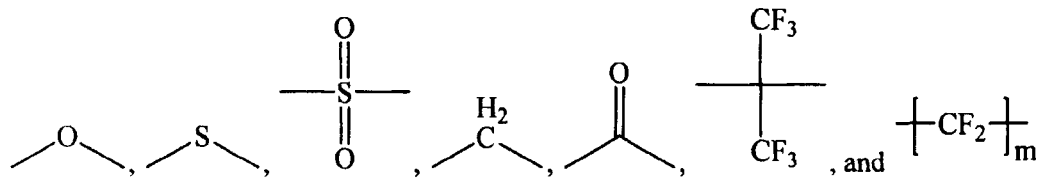

with n = 0, 1, 2, 3, 4 or 5."

should read as

--wherein Y is at least one selected from the group consisting of

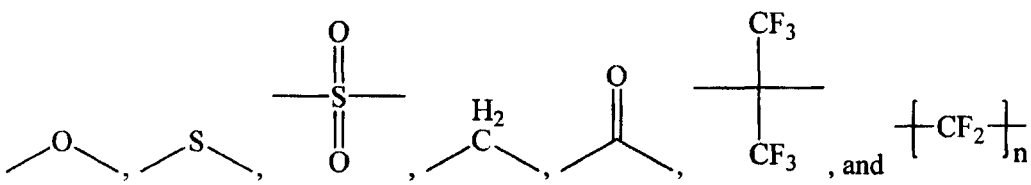

with n = 0, 1, 2, 3, 4 or 5.--

Signed and Sealed this
Twenty-ninth Day of May, 2012

David J. Kappos
*Director of the United States Patent and Trademark Office*